US 12,148,095 B2

United States Patent
Zhi et al.

(10) Patent No.: US 12,148,095 B2
(45) Date of Patent: Nov. 19, 2024

(54) METHODS FOR A RASTERIZATION-BASED DIFFERENTIABLE RENDERER FOR TRANSLUCENT OBJECTS

(71) Applicant: Lemon Inc., Grand Cayman (KY)

(72) Inventors: Tiancheng Zhi, Los Angeles, CA (US); Shen Sang, Los Angeles, CA (US); Guoxian Song, Los Angeles, CA (US); Chunpong Lai, Los Angeles, CA (US); Jing Liu, Los Angeles, CA (US); Linjie Luo, Los Angeles, CA (US)

(73) Assignee: LEMON INC., Grand Cayman (KY)

(*) Notice: Subject to any disclaimer, the term of this patent is extended or adjusted under 35 U.S.C. 154(b) by 126 days.

(21) Appl. No.: 17/932,640

(22) Filed: Sep. 15, 2022

(65) Prior Publication Data

US 2024/0096018 A1 Mar. 21, 2024

(51) Int. Cl.
*G06T 17/20* (2006.01)
*G06T 17/10* (2006.01)

(52) U.S. Cl.
CPC ............ *G06T 17/20* (2013.01); *G06T 17/10* (2013.01); *G06T 2210/62* (2013.01)

(58) Field of Classification Search
CPC ....... G06T 17/20; G06T 17/005; G06T 17/10; G06T 17/205; G06T 15/005; G06T 15/06; G06T 15/20; G06T 15/80; G06T 2210/62; G06T 15/503
See application file for complete search history.

(56) References Cited

U.S. PATENT DOCUMENTS

| | | | |
|---|---|---|---|
| 7,133,041 B2 * | 11/2006 | Kaufman | G06T 15/08 345/419 |
| 10,963,985 B2 * | 3/2021 | Doyle | G06T 1/60 |
| 10,991,127 B2 * | 4/2021 | Nevraev | G06T 15/80 |
| 11,145,105 B2 * | 10/2021 | Surti | G06T 1/60 |
| 2004/0125103 A1 * | 7/2004 | Kaufman | G06T 15/08 345/419 |
| 2020/0410631 A1 * | 12/2020 | Doyle | G06T 1/20 |

OTHER PUBLICATIONS

Liu, S. et al., "Soft Rasterizer: A Differentiable Renderer for Image-based 3D Reasoning," Proceedings of the IEEE/CVF International Conference on Computer Vision, Oct. 27, 2019, Seoul, Korea, 10 pages.

* cited by examiner

*Primary Examiner* — Vijay Shankar
(74) *Attorney, Agent, or Firm* — Alleman Hall & Tuttle LLP (57) ABSTRACT

Systems and methods for rendering a translucent object are provided. In one aspect, the system includes a processor coupled to a storage medium that stores instructions, which, upon execution by the processor, cause the processor to receive at least one mesh representing at least one translucent object. For each pixel to be rendered, the processor performs a rasterization-based differentiable rendering of the pixel to be rendered using the at least one mesh and determines a plurality of values for the pixel to be rendered based on the rasterization-based differentiable rendering. The rasterization-based differentiable rendering can include performing a probabilistic rasterization process along with aggregation techniques to compute the plurality of values for the pixel to be rendered. The plurality of values includes a set of color channel values and an opacity channel value. Once values are determined for all pixels, an image can be rendered.

20 Claims, 5 Drawing Sheets

METHODS FOR A RASTERIZATION-BASED DIFFERENTIABLE RENDERER FOR TRANSLUCENT OBJECTS

BACKGROUND

In computer graphics, a renderer is a designed framework for implementing a rendering process. Rendering is the process of generating an image from a computer model, typically using light physics and mathematics to provide information on the scene to be rendered. The computer model represents an object as a mesh of virtual polygons, typically triangles. In this virtual mesh, the corners of each polygon are referred to as vertices while the boundaries are referred to as edges. The mesh can include information describing color, texture, position in space, etc. The rendering process uses information such as geometry, viewpoint, texture, lighting, and shading to convert a scene into pixels, which form the image. Each pixel can be assigned an initial color value from the data stored in the polygons. Further pixel processing can include changing pixel color based on lighting information of the scene.

Images can be pre-rendered or rendered in real time depending on the specific application. Pre-rendering is a slow and computationally intensive process that is typically used for media creation as the media can be generated ahead of time in typical use cases. Real-time rendering is often done for video games and other applications that must dynamically create scenes.

Different rendering techniques have been developed. Advantages and disadvantages among these techniques can depend on the specific application. One technique includes rasterization. In rasterization, colors, textures, and lighting effects are determined on a per-pixel basis during the rendering process. This technique is efficient and can be adapted to non-photorealistic applications. One drawback of the technique is that it has a difficult time tracking exactly how the light in a scene should travel and interact with other elements of the scene. Another rendering technique includes ray tracing. Ray tracing is a slow and resource intensive rendering technique that creates an image based on a virtual light source and how that light source interacts with the object(s) to be rendered. Ray tracing involves tracing the path of light as pixels in an image plane and reproducing the path that each light ray follows in reverse direction from the rendering camera back to its point of origin. This creates a far more life-like rendering.

SUMMARY

Systems and methods for rendering a translucent object are provided. In one aspect, the system includes a processor coupled to a storage medium that stores instructions, which, upon execution by the processor, cause the processor to receive at least one mesh representing at least one translucent object. For each pixel to be rendered, the processor performs a rasterization-based differentiable rendering of the pixel to be rendered using the at least one mesh and determines a plurality of values for the pixel to be rendered based on the rasterization-based differentiable rendering. The rasterization-based differentiable rendering can include performing a probabilistic rasterization process along with aggregation techniques to compute the plurality of values for the pixel to be rendered. The plurality of values includes a set of color channel values and an opacity channel value. Once values are determined for all pixels, an image can be rendered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Standard graphics renderers utilizing rasterization-based techniques typically implement such steps in the rendering process in a discrete manner, preventing the rendering process from being differentiable. As a result, the process cannot be applied in certain applications, such as deep learning applications. Differentiable renderers have been contemplated but include several disadvantages. For example, differentiable renderers utilizing ray-tracing techniques have been contemplated. Ray tracing is a technique that simulates the physical behavior of light to render objects. The resulting rendering is highly detailed and typically used in photorealistic applications. However, ray tracing is a slow and resource-intensive process. As such, it is not an ideal or feasible approach in many applications. Rasterization-based differentiable renderers have been implemented to use probabilistic methods to allow multiple polygons within a mesh, or meshes, to contribute to the color of a rendered pixel. However, this creates a non-trivial problem for the rendering of translucent objects.

Translucent objects have semi-transparent properties that add a level of complexity in the rendering pipeline. In computer graphics, the transparency level of an object or polygon can be formatted as an attribute, denoted as the opacity channel or alpha channel. In a typical rendering, the rendered pixels are a representation of objects that are visible to the rendering camera. Specifically, the color of a rendered pixel is determined by the color of the object nearest to the rendering camera. However, with translucent objects, the color of occluded objects becomes a factor. Transparency or opacity values of the object causing the occlusion can determine how much the color of the occluded object factors into the color of the rendered pixel.

Current rasterization-based differentiable rendering techniques utilize probabilistic methods that propose all polygons within a mesh, or meshes, have probabilistic contributions to each rendered pixel. By being over inclusive in the number of polygons affecting a given pixel, these methods are unable to accurately account for the effect of opacity values on the rendered pixel. Standard alpha blending rules cannot handle a large number of layers due to the multiplicative nature of the blending formula, even when weighted by probability values.

In view of the observations above, systems and methods for rasterization-based differentiable renderers for translucent objects are presented. Compared to standard rasterization steps, which are typically discretized processes, renderers for translucent objects in accordance with the present disclosure can be configured as a differentiable renderer. In many implementations, the renderer is configured to utilize probabilistic processes and aggregation mechanisms to implement a differentiable framework. The differentiability enables "inverse rendering" applications, which can be used to infer physics and geometry parameters from two-dimensional images (e.g., three-dimensional reconstruction, lighting estimation, material estimation, etc.). For example, the differentiable nature of the renderer enables the implementation of neural networks and non-learning optimization frameworks that can infer three-dimensional properties from a two-dimensional image using an inverse of the rendering function.

In many implementations according to the present disclosure, a rendering process is implemented for the rendering of translucent objects using a rasterization-based differentiable renderer. The rendering process can include receiving a computer model. The computer model can be configured in various formats. In some implementations, the computer model includes at least one mesh representing at least one translucent object. The at least one mesh can also represent at least one solid object. A mesh includes a set of vertices and a set of polygons that collectively define a three-dimensional geometrical shape that represents an object. The mesh can further include additional attributes, such as color, opacity, texture, location, etc. The computer model can further include information describing a scene to be rendered.

The rendering process can include performing a rasterization-based differentiable rendering of a pixel for every pixel in an image to be rendered. A rasterization-based differentiable rendering is performed using the received computer model. Rasterization-based differentiable rendering processes can include a probabilistic rasterization step in combination with various aggregation techniques to determine values describing color and other information that can be used to render a pixel. The rendering process can repeat iteratively until all pixels of the image to be rendered are rendered. These and other rasterization-based differentiable rendering frameworks are described in the sections below in further detail.

Figure 1:
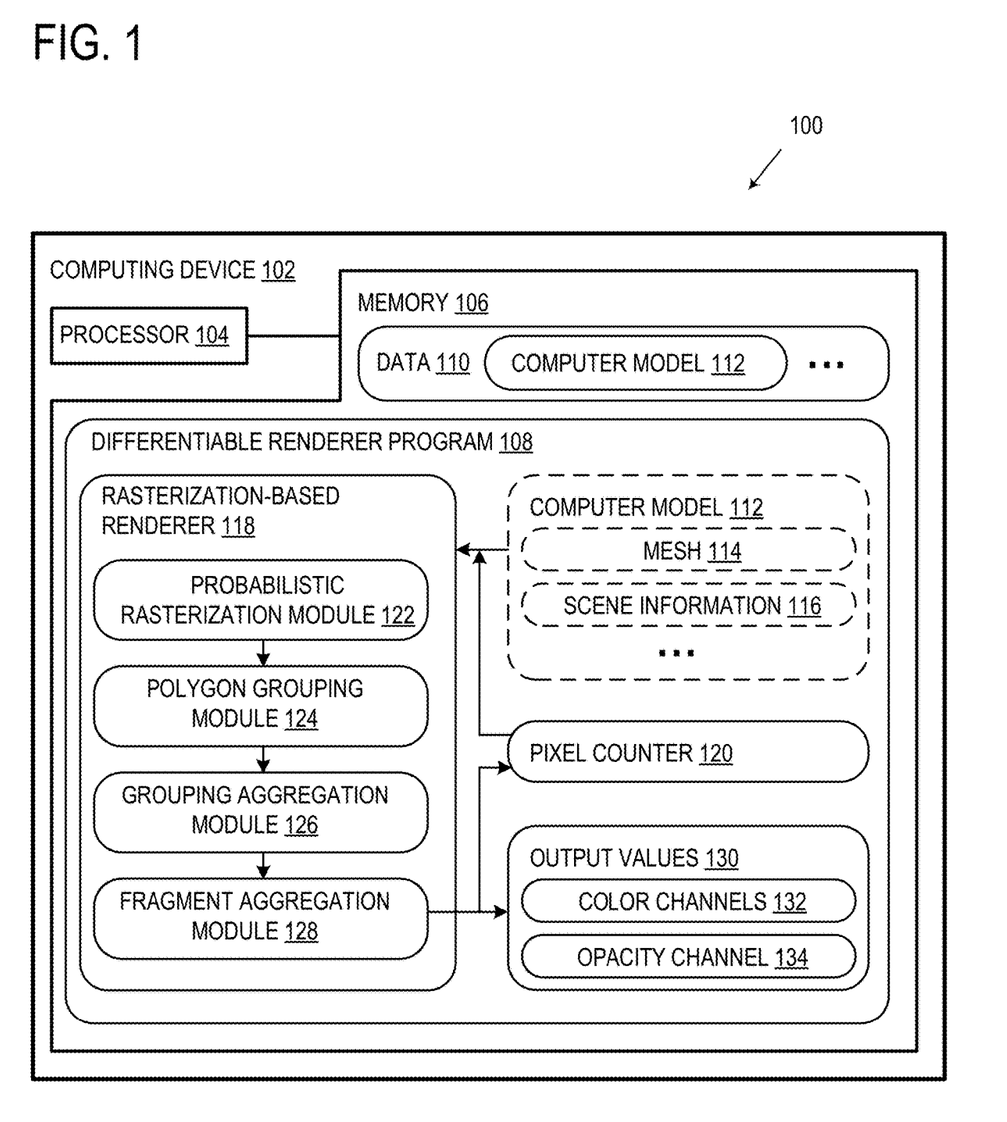
FIG. 1 shows a schematic view of a computing system configured to perform a differentiable rendering process for translucent objects in accordance with an implementation of the present disclosure.

FIG. 1 shows a schematic view of a computing system 100 having a computing device 102 configured to perform a differentiable rendering process for translucent objects in accordance with an implementation of the present disclosure. As shown, the computing device 102 includes a processor 104 (e.g., central processing units, or "CPUs") and memory 106 (e.g., volatile and non-volatile memory) operatively coupled to each other. The memory 106 stores a differentiable renderer program 108, which contains instructions for the various software modules described herein for execution by the processor 104. The memory 106 also stores data 110 for use by the differentiable renderer program 108 and its software modules.

Upon execution by the processor 104, the instructions stored in the differentiable renderer program 108 cause the processor 104 to retrieve a computer model 112 from data 110 stored in memory 106 for use by the differentiable renderer program 108. The computer model 112 can include different types of data for the rendering process. In the depicted system 100 of FIG. 1, the computer model 112 data includes one or more meshes 114 and scene information 116. The mesh 114 can be represented in different ways. Typically, the mesh 114 is a polygon mesh represented by vertices, edges, and polygons. Polygons of various geometries can be used (e.g., triangles, quadrilaterals, and other polygons, etc.). In many implementations, the polygon mesh includes convex polygons. The mesh 114 can further include information, such as color, opacity, texture, location, etc., that describes the object to be rendered. The mesh 114 can include color and opacity information associated with each polygon. For example, each polygon can include a set of polygon color channel values and a polygon opacity channel value. In some implementations, the color information is represented by values indicating red, green, and blue (RGB) channels. In other implementations, color information is represented by values indicating cyan, magenta, yellow and black (CMYK) channels. In some implementations, the transparency information is represented by a value indicating an opacity channel, with higher values representing higher opacity. Scene information 116 can include information regarding the environment in which the rendering is being performed. Example scene information can include lighting information and camera information.

In many implementations, the mesh 114 describes an object with translucent properties. For example, the mesh 114 can include information describing the opacity level for a given polygon. As briefly discussed above, the rendering of translucent objects is a non-trivial problem. In a typical rasterization process for rendering solid objects, the objects are rendered based on a view of a rendering camera. The color for a given pixel is determined by the color of the polygon closest to the rendering camera for that given pixel location. Consequently, occluded objects do not contribute to the color of the rendered pixel. For translucent objects, the color of occluded objects should contribute to the color of the rendered pixel, similar to real life conditions. Primitive techniques for handling translucency include giving weight to the color of occluded objects to be used in computing the color of the pixel to be rendered. The weight is typically based on the opacity level of the object causing the occlusion. However, the mathematics involved in these techniques is no longer applicable when a soft rasterization process is applied.

The differentiable renderer program 108 includes a rasterization-based renderer 118 that receives the retrieved computer model 112. The rasterization-based renderer 118 of the differentiable renderer program 108 can be configured to render translucent objects. The rasterization-based renderer 118 can be configured to perform the rendering process for a pixel using the received computer model 112. The process can repeat iteratively for every pixel of the image that is to be rendered. As such, the differentiable renderer program 108 can include a pixel counter 120 to determine the pixel to be rendered in a given iteration. For a given pixel to be rendered, the rasterization-based renderer 118 can first use a probabilistic rasterization module 122 to perform a probabilistic rasterization using at least one mesh 114 of the computer model 112. The probabilistic rasterization process first determines a set of polygons within the mesh(es) 114. The set of polygons can be determined using various processes. In some implementations, the set of polygons is determined based on a distance threshold. For example, for a given polygon, the determination process can select the given polygon if the location of the center of the pixel to be rendered is within a distance threshold across two dimensions of an edge of the given polygon. In such cases, the depth dimension is omitted. The distance threshold can depend on the specific application. In some implementations, the polygons are blurred using a blurring radius. In such cases, polygons are selected if its blurred bounding box covers the pixel to be rendered. Different blurring radii can be used depending on the application.

The probabilistic rasterization process can further include assigning a probability value to each of the determined polygons based on the pixel to be rendered. The probability values can be computed using a variety of different calculations and functions. In some implementations, the probability value P is computed using a sigmoid function. In some implementations, the probability value P is defined as:

$$P = \text{sigmoid}\left(\delta \frac{d^2}{\sigma}\right),$$

where d is the Euclidean distance between the center of the pixel to be rendered and a boundary of the polygon, $\delta=1$ when the pixel is inside the polygon and $\delta=-1$ otherwise, and $\sigma$ is a parameter controlling the softness of the rasterization. Other distance metrics can be used depending on the application.

After probability values are computed, the given pixel will be considered "covered" by a set of polygons with non-zero probabilities. A polygon grouping module 124 is then used to separate the set of polygons into a plurality of groups. The polygons can be grouped using different criteria. In some implementations, the polygons are grouped if the depth difference among them is smaller than a predetermined threshold. In further implementations, the polygons are grouped if they are on the same mesh in addition to satisfying the depth difference threshold. Depth differences can be calculated relative to the rendering camera.

The rasterization-based renderer 118 can further include a grouping aggregation module 126 for performing an aggregation technique on each group of polygons. Each group of polygons is aggregated into one fragment. The fragment can include information that is derived from the polygons. For example, the fragment can include a set of fragment color channel values and a fragment opacity channel value. In some implementations, the set of fragment color channel values include a fragment red color channel value, a fragment green color channel value, and a fragment blue color channel value. In other implementations, the set of fragment color channel values include a fragment cyan color channel value, a fragment magenta color channel value, a fragment yellow color channel value and a fragment black color channel value. The set of fragment color channel values and the fragment opacity channel value can be computed by using weighted averages. A fragment color channel value can be computed based on a weighted average of corresponding polygon color channel values from each of the polygons within a subset of grouped polygons. For example, a red fragment color channel value can be computed using a weighted average of the red polygon color channel value of each polygon within a group of polygons. Different weight functions can be implemented. In some implementations, the weight for the values of each polygon is their associated probability value P. In some implementations, the weight for the polygon color channel values of each polygon is their associated probability value P. In some implementations, the weight for the polygon opacity channel value is given by the function: min(2P, 1). In further implementations, the weight for the polygon opacity channel value is given by the function: min(max(2P, 0), 1).

The rasterization-based renderer 118 can further include a fragment aggregation module 128, which aggregates the fragments in accordance with an alpha blending rule to determine a plurality of values 130 for the pixel to be rendered. In the depicted system 100 of FIG. 1, the plurality of values 130 includes color channel values 132 and an opacity channel value 134. The fragment aggregation process can include ordering the fragments based on their depth value relative to the rendering camera. For a given pixel to be rendered, the color and opacity channels of n fragments can be denoted respectively as $\text{color}_i$ and $\text{alpha}_i$ (i=1, 2, ..., n), where higher values of i indicates larger depth values. As described in the examples above, multiple color channels can be used. Different alpha blending rules can be applied to aggregate the fragment. In some implementations, the fragments are aggregated using the following alpha blending rules to compute the plurality of values 130 for the pixel to be rendered:

$$\text{alpha} = 1 - \prod_{i=1}^{n}(1 - \text{alpha}_i),$$

$$\text{color} = \frac{1}{\text{alpha}}\sum_{i=1}^{n}\left[\text{alpha}_i \times \text{color}_i \times \prod_{j=1}^{i-1}(1 - \text{alpha}_j)\right],$$

where alpha is the opacity channel value 134 and color is one of the color channel values 132.

After the pixel is rendered, the pixel counter 120 can be updated to the next pixel to be rendered, and the rasterization-based renderer 118 starts the process again. Once the iterative loops are completed, a rendered image can be outputted.

The system 100 of FIG. 1 illustrates a general framework for a rasterization-based differentiable renderer capable of rendering translucent objects. As can readily be appreciated, the framework can be configured, adjusted, and applied to different applications. Different applications can have different requirements. For example, computer models to be rendered can be presented in different formats. Different polygon meshes can be utilized. In many implementations, the mesh is a triangle mesh, although polygons of other shapes may be utilized.

Figure 2A:
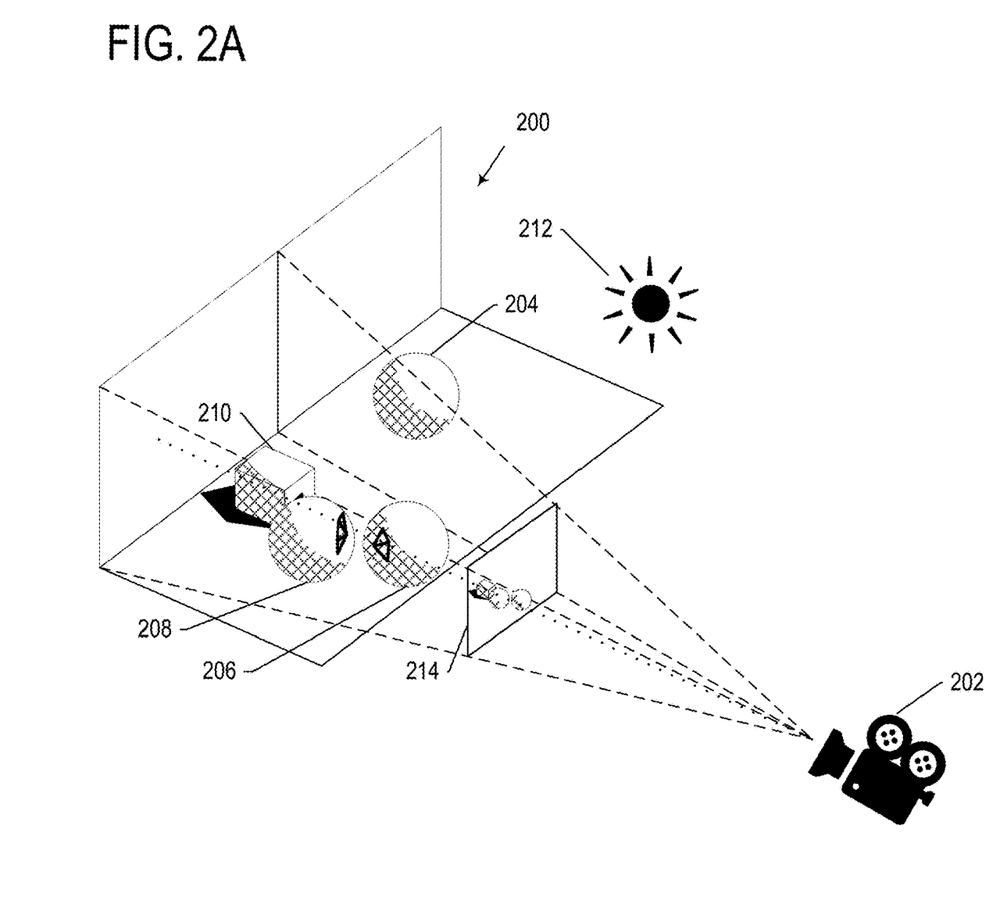
FIG. 2A shows a diagram conceptually illustrating a three-dimensional rendering scene using a perspective camera in accordance with an implementation of the present disclosure, which may be implemented using the system of FIG. 1 or other suitable hardware and software.
Figure 2B:
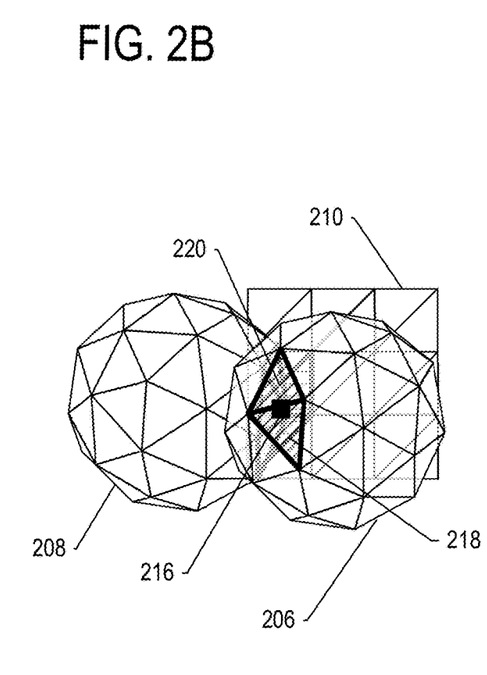
FIG. 2B shows a diagram conceptually illustrating performing a probabilistic rasterization on triangle meshes in accordance with an implementation of the present disclosure.

FIG. 2A shows a diagram conceptually illustrating a three-dimensional rendering scene 200 using a perspective camera 202 in accordance with an implementation of the present disclosure. FIG. 2B shows a diagram conceptually illustrating performing a probabilistic rasterization on triangle meshes in accordance with an implementation of the present disclosure. The scene 200 is a computer model that includes four objects 204-210. The objects 204-210 can be represented in various ways, including polygon meshes. As shown in FIG. 2B, the objects 204-208 can be represented as triangle meshes. In addition to the perspective camera 202, the scene 200 further includes a light source 212. The location and intensity of the light source 212 provides information detailing the shading of the objects 204-210. The shading can be used to adjust the color of the object in the rendered pixel. The location and settings of the camera 202 determines the image plane 214 from which a two-dimensional image can be rendered. In the depicted scene 200 of FIG. 2A, the location of the camera 202 captures three objects 206-210 while leaving out the fourth object 204. At the depicted viewpoint, two objects 208, 210 are partially occluded by the third object 206. If the front object 206 is translucent, the color of the rendered pixel(s) in that location should be adjusted to reflect how translucent objects are viewed in the real world. For example, the color of the rendered pixel(s) in that location can be adjusted based on the color of the occluded objects 208, 210 at that location and the opacity value(s) of the front object 206 and/or occluded objects 208, 210. FIG. 2B shows an example rendered pixel location 216. As shown, objects 206-210 is associated with the location 216 of the pixel to be rendered. In the depicted diagram, at least objects 206 and 208 are translucent. As described above, the probabilistic rasterization process can include determining a set of polygons associated with the pixel to be rendered based on a distance threshold across two dimensions. In FIG. 2B, each of the three objects 206-210 includes two or three triangles that satisfy a distance threshold and are thus associated with the location of the pixel 216. For example, object 206 includes triangles 218 and 220 that are selected for the probabilistic rasterization process.

Figure 3:
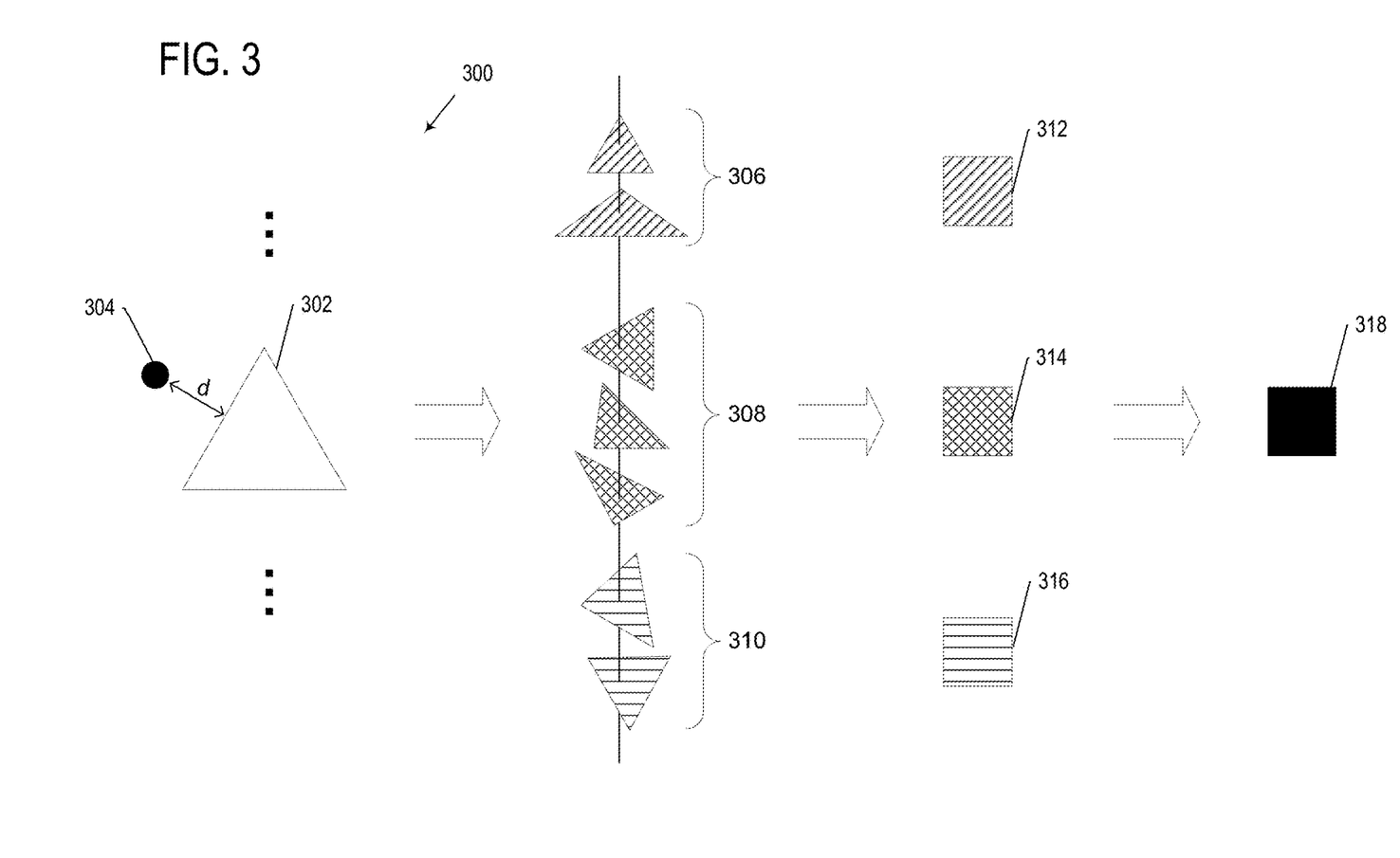
FIG. 3 shows a diagram conceptually illustrating a framework for rendering translucent objects in accordance with an implementation of the present disclosure, which may be implemented using the system of FIG. 1 or other suitable hardware and software.

FIG. 3 shows a diagram conceptually illustrating a framework 300 for rendering translucent objects in accordance with an implementation of the present disclosure. In the illustrative framework 300, the rendering process is applied to a triangle mesh. The process starts with a probabilistic rasterization process where triangles 302 are selected based on a distance threshold to a location 304 of a pixel to be rendered. The distance d between the center 304 of the pixel to be rendered and an edge or boundary of the triangle 302 can be used to compare with the distance threshold. The distance can be based on a two-dimensional plane, with the depth dimension omitted relative to the rendering camera.

Once the triangles 302 are determined, probability values P for each triangle 302 can be computed based on the distance d. Probability values can be computed using any of the processes described in the sections above. For example, the probability value P can be computed as $$P = \text{sigmoid}\left(\delta \frac{d^2}{\sigma}\right),$$

where d is the Euclidean distance between the center of the pixel to be rendered and a boundary of the triangle, $\delta=1$ when the pixel is inside the triangle and $\delta=-1$ otherwise, and $\sigma$ is a parameter controlling the softness of the rasterization.

The rendering process can then group the determined triangles 302 into groups based on a depth difference threshold. For example, the triangles 302 can be grouped together if the depth difference among them satisfies a depth difference threshold. In some implementations, the triangles 302 are grouped together if they are on the same mesh in addition to satisfying a depth difference threshold. In the diagram of FIG. 3, the triangles 302 are grouped into three groups 306-310.

Once the triangles are grouped, each group of triangles 306-310 can be aggregated into a fragment. As shown, group 306 is aggregated into fragment 312, group 308 is aggregated into fragment 314, and group 310 is aggregated into fragment 316. The fragments 312-316 can include information that is derived from the triangles 302 within their respective group. For example, each fragment 312-316 can include a set of fragment color channel values and a fragment opacity channel value. Each triangle 302 can include a set of polygon color channel values and a polygon opacity channel value. The set of fragment color channel values can be computed using weighted averages of the corresponding polygon color channel values of each triangle 302 in the group of triangles. Different weight functions can be implemented. In some implementations, the weight for the polygon color channel values of each triangle 302 is their associated probability value P. In some implementations, the weight for the polygon opacity channel value is given by the function: min(2P, 1). In further implementations, the weight for the polygon opacity channel value is given by the function: min(max(2P, 0), 1).

The fragments 312-316 can be aggregated to determine a plurality of values, which can be used to render a pixel 318. The plurality of values can include a set of color channel values and an opacity channel value. For example, the plurality of values can include RGB channel values and an opacity channel value. The fragments 312-316 can be aggregated using any of the processes described in the sections above. For example, the fragments 312-316 can be aggregated in accordance with a standard alpha blending rule.

Figure 4:
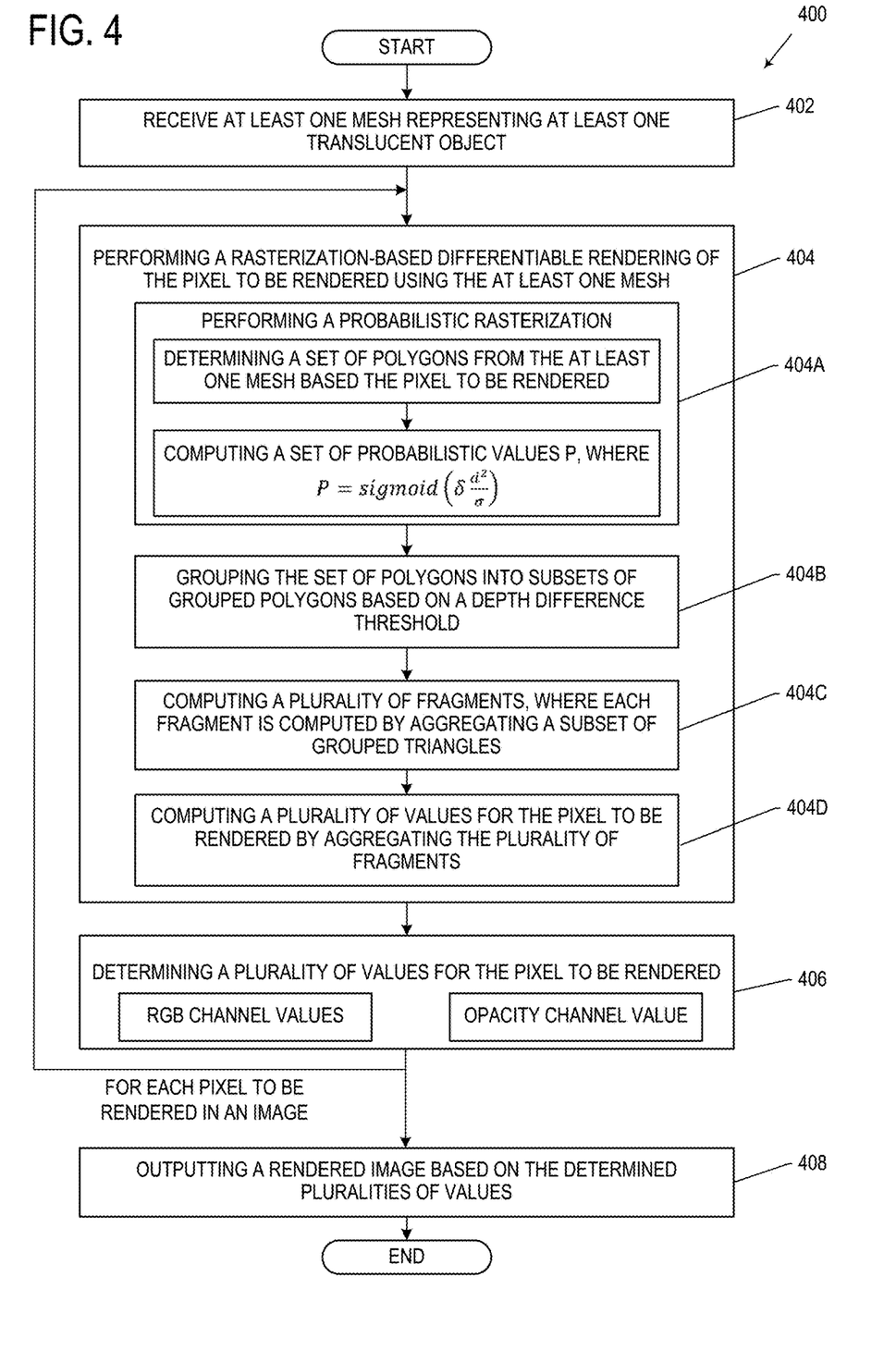
FIG. 4 shows a flow diagram conceptually illustrating a method for rendering translucent objects in accordance with an implementation of the present disclosure, which may be implemented using the system of FIG. 1 or other suitable hardware and software.

FIG. 4 shows a flow diagram conceptually illustrating a method 400 for rendering translucent objects in accordance with an implementation of the present disclosure, which may be implemented using the system of FIG. 1 or other suitable hardware and software.

At step 402, the method 400 includes receiving at least one mesh representing at least one translucent object. The at least one mesh can further represent at least one solid object. The mesh includes a set of vertices and a set of polygons. Different polygons can be used. In some implementations, the mesh is a triangle mesh. The mesh can include additional attributes, such as color, opacity, texture, location, etc. The mesh can include color and opacity information associated with each polygon. For example, each polygon can include a set of polygon color channel values and a polygon opacity channel value. In some implementations, the color information is represented by values indicating RGB channels. In other implementations, color information is represented by values indicating CMYK channels. In some implementations, the transparency information is represented by a value indicating an opacity channel, with higher values representing higher opacity.

At step 404, the method 400 includes performing a rasterization-based differentiable rendering of a pixel to be rendered using the at least one mesh. Performing a rasterization-based differentiable rendering can be implemented in many different ways. Steps 404A-404D, as discussed in the sections below, describe one process for performing a rasterization-based differentiable rendering.

At step 404A, the method 400 includes performing a probabilistic rasterization using the at least one mesh. Performing a probabilistic rasterization can include determining a set of polygons from the at least one mesh based on the pixel to be rendered. The set of polygons can be determined using various processes. In some implementations, the set of polygons is determined based on a distance threshold. For example, for a given polygon, the determination process can select the given polygon if the location of the center of the pixel to be rendered is within a distance threshold across two dimensions of an edge of the given polygon. In some implementations, the polygons are blurred using a blurring radius, and polygons are selected if its blurred bounding box covers the pixel to be rendered. The probabilistic rasterization process can further include computing a set of probability values P. The set can include a probability value P for each of the determined polygons based on the pixel to be rendered. The probability value P can be computed based on a distance d of a location of the pixel to be rendered and an edge of a polygon within the determined set of polygons. For example, the probability value P can be computed based on a distance d of a center of the pixel to be rendered and an edge of a polygon within the determined set of polygons. In some implementations, the probability value P is computed using a sigmoid function. In some implementations, the probability value P is defined as:

$$P = \text{sigmoid}\left(\delta \frac{d^2}{\sigma}\right),$$

where d is the Euclidean distance between the center of the pixel to be rendered and a boundary of the polygon, $\delta=1$ when the pixel is inside the polygon and $\delta=-1$ otherwise, and $\sigma$ is a parameter controlling the softness of the rasterization.

At step 404B, the method 400 includes grouping the set of polygons into subsets of grouped polygons based on a depth difference threshold. In some implementations, the polygons are grouped if the depth difference among them is smaller than a predetermined threshold. In further implementations, the polygons are grouped if they satisfy the depth difference threshold in addition to being on the same mesh. Depth differences can be calculated relative to the rendering camera.

At step 404C, the method 400 includes computing a plurality of fragments, where each fragment is computed by aggregating a subset of grouped polygons. Each fragment can include a set of fragment color channel values and a fragment opacity channel value. In some implementations, the set of fragment color channel values include fragment RGB color channel values. In other implementations, the set of fragment color channel values include fragment CMYK color channel values. The set of fragment color channel values and the fragment opacity channel value can be computed by using weighted averages. For example, a fragment color channel value can be computed based on a weighted average of corresponding polygon color channel values from each of the polygons within a subset of grouped polygons. In some implementations, the weight for each polygon is their associated probability value P. In some implementations, the weight for the polygon color channel values of each polygon is their associated probability value P. In some implementations, the weight for the polygon opacity channel value is given by the function min(2P, 1). In further implementations, the weight for the polygon opacity channel value is given by the function min(max(2P, 0), 1).

At step 404D, the method 400 includes computing a plurality of values for the pixel to be rendered by aggregating the plurality of fragments. The plurality of values can include a set of color channel values and an opacity channel value. In some implementations, the set of color channel values includes RGB color channel values. In some implementations, the set of color channel values includes CMYK color channel values. The fragment aggregation process can include ordering the fragments based on their depth value relative to the rendering camera. The opacity channel value for the pixel to be rendered can be computed as: alpha=1−$\Pi_{i=1}^{n}(1-\text{alpha}_i)$, where alpha is the computed opacity channel value, n is the number of fragments in the plurality of fragments, and $\text{alpha}_i$ is a fragment opacity channel value. The set of color channel values for the pixel to be rendered can be computed as:

$$\text{color} = \frac{1}{\text{alpha}} \sum_{i=1}^{n}\left[\text{alpha}_i \times \text{color}_i \times \prod_{j=1}^{i-1}(1-\text{alpha}_j)\right],$$

where color is the color channel value that is to be computed, $\text{color}_i$ is a fragment color channel value, and $\text{alpha}_j$ is a fragment opacity channel value.

At step 406, the method 400 includes determining a plurality of values for the pixel to be rendered based on the rasterization-based differentiable rendering. The plurality of values for the pixel to be rendered can be determined in a variety of different ways. In some implementations, the plurality of values for the pixel to be rendered is determined by aggregating fragments, such as the example process described in step 404D.

At step 408, the method 400 includes outputting a rendered image based on the determined pluralities of values. The rendered image can be a two-dimensional representation of three-dimensional objects represented by the at least one mesh. In some implementations, at least one of the objects is translucent. In some implementations, at least one of the objects is opaque.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
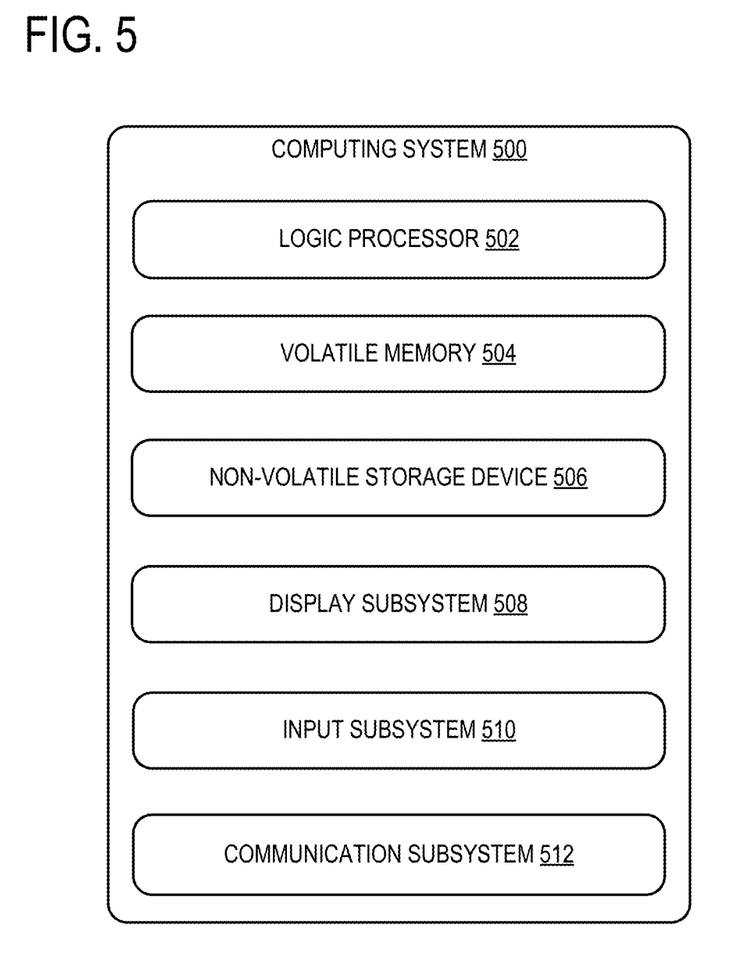
FIG. 5 shows a schematic view of an example computing environment in which the computing system of FIG. 1 may be enacted.

FIG. 5 schematically shows a non-limiting embodiment of a computing system 500 that can enact one or more of the methods and processes described above. Computing system 500 is shown in simplified form. Computing system 500 may embody the computer device 102 described above and illustrated in FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display sub system 508, input sub system 510, communication sub system 512, and/or other components not shown in FIG. 5.

Logic processor 502 includes one or more physical devices configured to execute instructions. For example, the logic processor 502 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 502 may include one or more physical processors (hardware) configured to execute software instructions. Additionally or alternatively, the logic processor 502 may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 502 may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device 506, and thus transform the state of the non-volatile storage device 506, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem 510 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem 512 may be configured for communication via a wireless telephone network, or a wired or wireless local- or wide-area network, such as a HDMI over Wi-Fi connection. In some embodiments, the communication subsystem 512 may allow computing system 500 to send and/or receive messages to and/or from other devices via a network such as the Internet.

One aspect of the present disclosure provides a computer system for rendering a translucent object, the computer system comprising a processor coupled to a storage medium that stores instructions, which, upon execution by the processor, cause the processor to receive at least one mesh representing at least one translucent object, for each pixel to be rendered, perform a rasterization-based differentiable rendering of the pixel to be rendered using the at least one mesh, and determine a plurality of values for the pixel to be rendered based on the rasterization-based differentiable rendering, wherein the plurality of values includes a set of color channel values and an opacity channel value, and output a rendered image based on the determined pluralities of values. In this aspect, additionally or alternatively, performing the rasterization-based differentiable rendering includes performing a probabilistic rasterization by determining a set of polygons from the at least one mesh based on the pixel to be rendered, and computing a set of probability values associated with the determined set of polygons, wherein each probability value is computed based on a location of the pixel to be rendered and an edge of a polygon within the determined set of polygons. In this aspect, additionally or alternatively, each of the probability values is computed using a sigmoid function. In this aspect, additionally or alternatively, performing the rasterization-based differentiable rendering further includes grouping the determined set of polygons based on a depth difference threshold into subsets of grouped polygons. In this aspect, additionally or alternatively, performing the rasterization-based differentiable rendering further includes computing a plurality of fragments, wherein each fragment includes a set of fragment color channel values and a fragment opacity channel value computed by aggregating a subset of grouped polygons. In this aspect, additionally or alternatively, each polygon in the determined set of polygons includes a set of polygon color channel values and a polygon opacity channel value, each fragment color channel value is computed based on a weighted average of a corresponding polygon color channel value from each of the respective grouped polygons, and each fragment opacity channel value is computed based on a weighted average of a corresponding polygon opacity value from each of the respective grouped polygons. In this aspect, additionally or alternatively, a weight of P is used to compute the weighted average of the corresponding polygon color channel values, and a weight of min(2P, 1) is used to compute the weighted average of the corresponding polygon opacity value, where P is the probability value associated with the respective polygon. In this aspect, additionally or alternatively, the plurality of values for the pixel to be rendered is computed by aggregating the plurality of fragments. In this aspect, additionally or alternatively, the opacity channel value in the plurality of values for the pixel to be rendered is computed as: alpha=$1-\Pi_{i=1}^{n}(1-\text{alpha}_i)$, wherein alpha is the computed opacity channel value, n is the number of fragments in the plurality of fragments, and $\text{alpha}_i$ is a fragment opacity channel value, and the set of color channel values in the plurality of values for the pixel to be rendered is computed as:

$$\text{color} = \frac{1}{\text{alpha}} \sum_{i=1}^{n} \left[ \text{alpha}_i \times \text{color}_i \times \prod_{j=1}^{i-1}(1 - \text{alpha}_j) \right],$$

wherein color is the color channel value that is to be computed, $\text{color}_i$ is a fragment color channel value, and $\text{alpha}_j$ is a fragment opacity channel value. In this aspect, additionally or alternatively, the set of color channel values includes a red color channel value, a green color channel value, and a blue color channel value.

Another aspect provides a method for rendering a translucent object, the method comprising receiving at least one mesh representing at least one translucent object, for each pixel to be rendered, performing a rasterization-based differentiable rendering of the pixel to be rendered using the at least one mesh, and determine a plurality of values for the pixel to be rendered based on the rasterization-based differentiable rendering, wherein the plurality of values includes a set of color channel values and an opacity channel value, and outputting a rendered image based on the determined plurality of values. In this aspect, additionally or alternatively, performing the rasterization-based differentiable rendering includes performing a probabilistic rasterization by determining a set of polygons from the at least one mesh based on the pixel to be rendered, and computing a set of probability values associated with the determined set of polygons, wherein each probability value is computed based on a location of the pixel to be rendered and an edge of a polygon within the determined set of polygons. In this aspect, additionally or alternatively, each of the probability values is computed using a sigmoid function. In this aspect, additionally or alternatively, performing the rasterization-based differentiable rendering further includes grouping the determined set of polygons based on a depth difference threshold into subsets of grouped polygons. In this aspect, additionally or alternatively, performing the rasterization-based differentiable rendering further includes computing a plurality of fragments using the computed set of probability values, wherein each fragment includes a set of fragment color channel values and a fragment opacity channel value computed by aggregating a subset of grouped polygons. In this aspect, additionally or alternatively, each polygon in the determined set of polygons includes a set of polygon color channel values and a polygon opacity channel value, each fragment color channel value is computed based on a weighted average of a corresponding polygon color channel value from each of the respective grouped polygons, and each fragment opacity channel value is computed based on a weighted average of a corresponding polygon opacity value from each of the respective grouped polygons. In this aspect, additionally or alternatively, a weight of P is used to compute the weighted average of the corresponding polygon color channel values, and a weight of min(2P, 1) is used to compute the weighted average of the corresponding polygon opacity value, where P is the probability value associated with the polygon. In this aspect, additionally or alternatively, the plurality of values for the pixel to be rendered is computed by aggregating the plurality of fragments. In this aspect, additionally or alternatively, the opacity channel value in the plurality of values for the pixel to be rendered is computed as: alpha=$1-\Pi_{i=1}^{n}(1-\text{alpha}_i)$, wherein alpha is the computed opacity channel value, n is the number of fragments in the plurality of fragments, and $\text{alpha}_i$ is a fragment opacity channel value, and the set of color channel values in the plurality of values for the pixel to be rendered is computed as:

$$\text{color} = \frac{1}{\text{alpha}} \sum_{i=1}^{n} \left[ \text{alpha}_i \times \text{color}_i \times \prod_{j=1}^{i-1}(1 - \text{alpha}_j) \right],$$

wherein color is the color channel value that is to be computed, $\text{color}_i$ is a fragment color channel value, and $\text{alpha}_j$ is a fragment opacity channel value.

An additional aspect provides a method for use in rendering a translucent object, the method comprising receiving at least one mesh representing at least one translucent object, determining a pixel to be rendered, determining a set of triangles from the at least one mesh based on the pixel to be rendered, performing probabilistic rasterization for the pixel to be rendered by computing a plurality of probability values, wherein each probability value is computed based on a location of the pixel to be rendered and an edge of a triangle within the determined set of triangles, grouping the determined set of triangles based on a depth difference threshold into subsets of grouped triangles, computing a plurality of fragments using the computed set of probability values, wherein each fragment includes a set of fragment color channel values and a fragment opacity channel value computed by aggregating a subset of grouped triangles, and computing a set of color channel values and an opacity channel value for the pixel to be rendered by aggregating the plurality of fragments.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for use in rendering a translucent object, the method comprising:
   receiving at least one mesh representing at least one translucent object;
   determining a pixel to be rendered;
   determining a set of triangles from the at least one mesh based on the pixel to be rendered;
   performing probabilistic rasterization for the pixel to be rendered by computing a plurality of probability values, wherein each probability value is computed based on a location of the pixel to be rendered and an edge of a triangle within the determined set of triangles;
   grouping the determined set of triangles based on a depth difference threshold into subsets of grouped triangles;
   computing a plurality of fragments using the computed set of probability values, wherein each fragment includes a set of fragment color channel values and a fragment opacity channel value computed by aggregating a subset of grouped triangles; and
   computing a set of color channel values and an opacity channel value for the pixel to be rendered by aggregating the plurality of fragments.

2. A computer system for rendering a translucent object, the computer system comprising:
   a processor coupled to a storage medium that stores instructions, which, upon execution by the processor, cause the processor to:
   receive at least one mesh representing at least one translucent object;
   for each pixel to be rendered:
      perform a rasterization-based differentiable rendering of the pixel to be rendered using the at least one mesh by:
         performing a probabilistic rasterization by computing a set of probability values; and
      determine a plurality of values for the pixel to be rendered based on the set of probability values, wherein the plurality of values includes a set of color channel values and an opacity channel value; and
      output a rendered image based on the determined pluralities of values.

3. The system of claim 2, wherein performing the probabilistic rasterization comprises:
   determining a set of polygons from the at least one mesh based on the pixel to be rendered; and
   computing the set of probability values associated with the determined set of polygons, wherein each of the probability values is computed based on a location of the pixel to be rendered and an edge of a polygon within the determined set of polygons.

4. The system of claim 3, wherein each of the probability values is computed using a sigmoid function.

5. The system of claim 3, wherein performing the rasterization-based differentiable rendering further includes grouping the determined set of polygons based on a depth difference threshold into subsets of grouped polygons.

6. The system of claim 5, wherein performing the rasterization-based differentiable rendering further includes computing a plurality of fragments, wherein each fragment includes a set of fragment color channel values and a fragment opacity channel value computed by aggregating a subset of grouped polygons.

7. The system of claim 6, wherein:
   each polygon in the determined set of polygons includes a set of polygon color channel values and a polygon opacity channel value;
   each fragment color channel value is computed based on a weighted average of a corresponding polygon color channel value from each of the respective grouped polygons; and
   each fragment opacity channel value is computed based on a weighted average of a corresponding polygon opacity value from each of the respective grouped polygons.

8. The system of claim 7, wherein:
   a weight of P is used to compute the weighted average of the corresponding polygon color channel values; and
   a weight of min(2P, 1) is used to compute the weighted average of the corresponding polygon opacity value, where P is the probability value associated with the respective polygon.

9. The system of claim 6, wherein the plurality of values for the pixel to be rendered is computed by aggregating the plurality of fragments.

10. The system of claim 9, wherein:
    the opacity channel value in the plurality of values for the pixel to be rendered is computed as:

$$\text{alpha} = 1 - \prod_{i=1}^{n}(1 - \text{alpha}_i),$$

wherein alpha is the computed opacity channel value, n is the number of fragments in the plurality of fragments, and $\text{alpha}_i$ is a fragment opacity channel value; and
    the set of color channel values in the plurality of values for the pixel to be rendered is computed as:

$$\text{color} = \frac{1}{\text{alpha}}\sum_{i=1}^{n}\left[\text{alpha}_i \times \text{color}_i \times \prod_{j=1}^{i-1}(1 - \text{alpha}_j)\right],$$

wherein color is the color channel value that is to be computed, $\text{color}_i$ is a fragment color channel value, and $\text{alpha}_j$ is a fragment opacity channel value.

11. The system of claim 2, wherein the set of color channel values includes a red color channel value, a green color channel value, and a blue color channel value.

12. A method for rendering a translucent object, the method comprising:

receiving at least one mesh representing at least one translucent object;

for each pixel to be rendered:
  performing a rasterization-based differentiable rendering of the pixel to be rendered using the at least one mesh by:
    performing a probabilistic rasterization by computing a set of probability values; and
    determine a plurality of values for the pixel to be rendered based on the set of probability values, wherein the plurality of values includes a set of color channel values and an opacity channel value; and
  outputting a rendered image based on the determined plurality of values.

13. The method of claim 12, wherein performing the probabilistic rasterization comprises:
  determining a set of polygons from the at least one mesh based on the pixel to be rendered; and
  computing the set of probability values associated with the determined set of polygons, wherein each probability value is computed based on a location of the pixel to be rendered and an edge of a polygon within the determined set of polygons.

14. The method of claim 13, wherein each of the probability values is computed using a sigmoid function.

15. The method of claim 13, wherein performing the rasterization-based differentiable rendering further includes grouping the determined set of polygons based on a depth difference threshold into subsets of grouped polygons.

16. The method of claim 15, wherein performing the rasterization-based differentiable rendering further includes computing a plurality of fragments using the computed set of probability values, wherein each fragment includes a set of fragment color channel values and a fragment opacity channel value computed by aggregating a subset of grouped polygons.

17. The method of claim 16, wherein:
  each polygon in the determined set of polygons includes a set of polygon color channel values and a polygon opacity channel value;
  each fragment color channel value is computed based on a weighted average of a corresponding polygon color channel value from each of the respective grouped polygons; and
  each fragment opacity channel value is computed based on a weighted average of a corresponding polygon opacity value from each of the respective grouped polygons.

18. The method of claim 17, wherein:
  a weight of P is used to compute the weighted average of the corresponding polygon color channel values; and
  a weight of min(2P, 1) is used to compute the weighted average of the corresponding polygon opacity value, where P is the probability value associated with the polygon.

19. The method of claim 16, wherein the plurality of values for the pixel to be rendered is computed by aggregating the plurality of fragments.

20. The method of claim 19, wherein:
  the opacity channel value in the plurality of values for the pixel to be rendered is computed as:

$$alpha = 1 - \prod_{i=1}^{n}(1 - alpha_i),$$

wherein alpha is the computed opacity channel value, n is the number of fragments in the plurality of fragments, and $alpha_i$ is a fragment opacity channel value; and
  the set of color channel values in the plurality of values for the pixel to be rendered is compute $$color = \frac{1}{alpha}\sum_{i=1}^{n}\left[alpha_i \times color_i \times \prod_{j=1}^{i=1}(1 - alpha_j)\right],$$

wherein color is the color channel value that is to be computed, $color_i$ is a fragment color channel value, and $alpha_j$ is a fragment opacity channel value.

* * * * *